April 6, 1926.  1,579,444
O. GÜNTHER
PROCESS AND APPARATUS FOR PURIFYING BOILER FEED WATER
Filed July 17, 1923   2 Sheets-Sheet 1
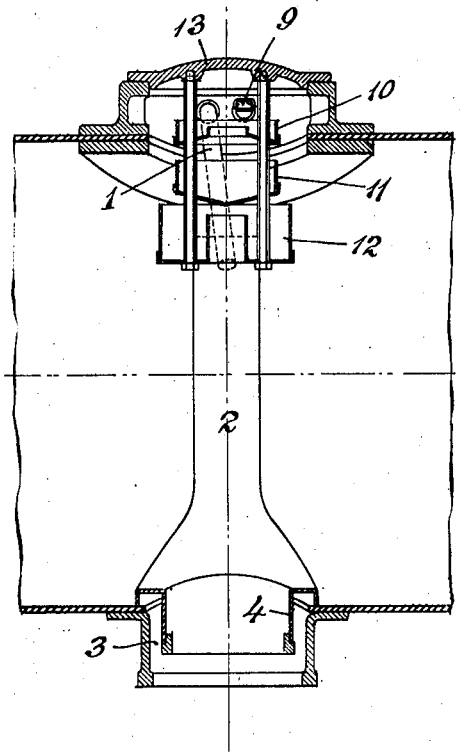
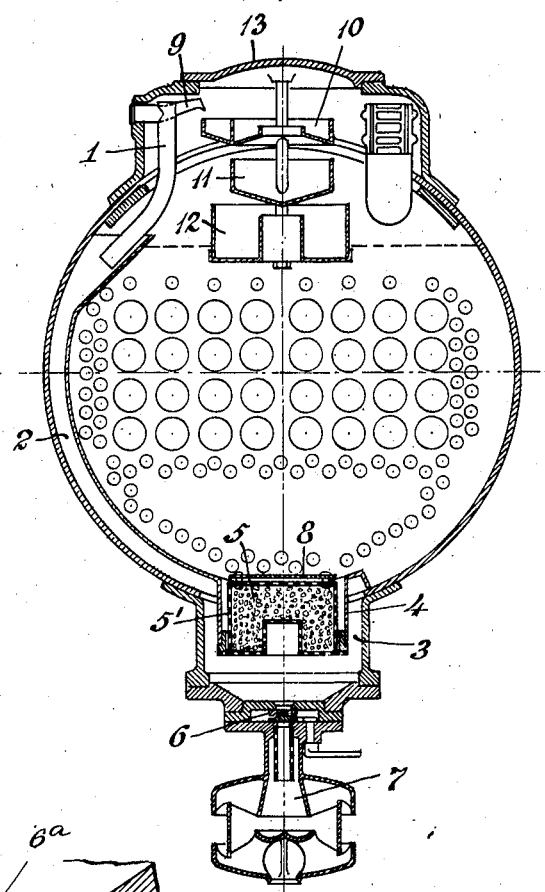
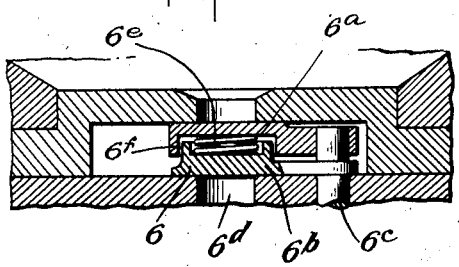
WITNESS
INVENTOR
OTTO GÜNTHER
BY
ATTORNEYS

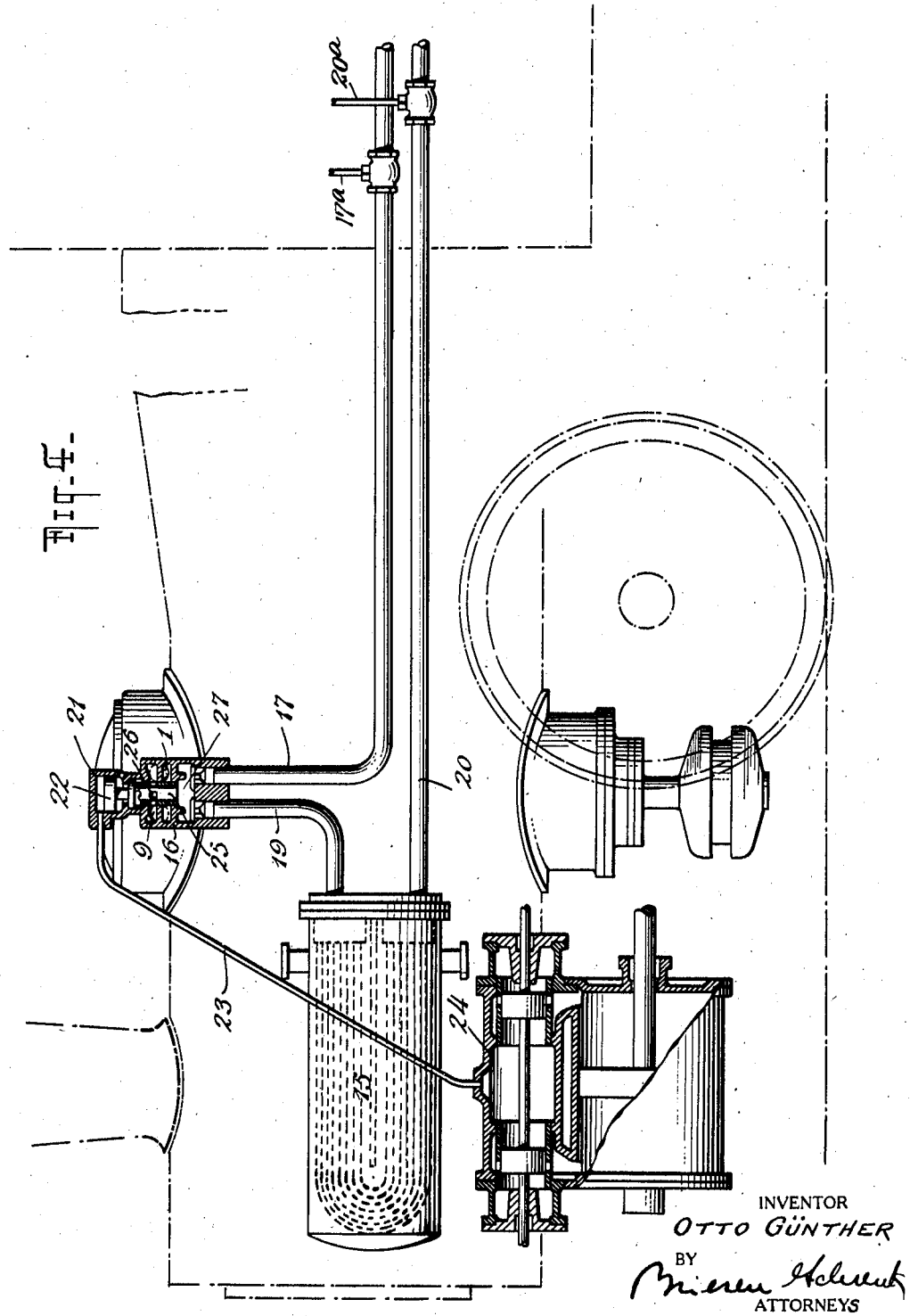

Patented Apr. 6, 1926.

1,579,444

UNITED STATES PATENT OFFICE.

OTTO GÜNTHER, OF ESSLINGEN, GERMANY, ASSIGNOR TO THE SUPERHEATER COMPANY, OF NEW YORK, N. Y., A CORPORATION OF DELAWARE.

PROCESS AND APPARATUS FOR PURIFYING BOILER-FEED WATER.

Application filed July 17, 1923. Serial No. 652,002.

*To all whom it may concern:*

Be it known that I, OTTO GÜNTHER, a citizen of Germany, and resident of Esslingen, Wurttemberg, Germany, have invented certain new and useful Improvements in Processes and Apparatus for Purifying Boiler-Feed Water, of which the following is a specification.

My invention relates to the purification of boiler feed water and has for its purpose to minimize the formation of boiler scale and the other drawbacks resulting from the presence of impurities in the water fed to boilers. Devices working on the principle of allowing the impurities to settle have not proved satisfactory in practice for the reason that the sludge or the like which it is desired to separate is necessarily stirred up by the flow of the feed water so that a portion of these impurities will be carried along by such water; in other cases the objection is that the temperature of the feed water is too high. Devices which operate by collecting and removing the boiler scale after its formation, have not been acceptable for the reason that they require a large amount of steam for the heating of the feed water and thus reduce the efficiency of the boiler.

According to my present invention the feed water in so far as it has been heated sufficiently exteriorly of the boiler, is conducted to a sludge separator located within the boiler and operating at a temperature below that at which boiler scale is formed. From this separator the feed water passes through a filter to the water space of the boiler; the sludge and other material retained by the filter may be removed or blown off from time to time. On the other hand any feed water which has not been preheated or which has been preheated only insufficiently, is conducted to a device located in the steam space of the boiler so that in this device the water will be heated to a temperature approximating that of the steam; owing to this higher temperature the impurities contained in the feed water will be converted into boiler scale or analogous formations which will be retained by such device while the purified water will pass directly to the water space of the boiler.

Satisfactory and preferred embodiments of my invention are illustrated by the accompanying drawings in which Fig. 1 is a vertical section through a portion of a boiler provided with my invention with parts omitted; Fig. 2 is a vertical section taken at right angles to Fig. 1 through the center portion thereof. Fig. 3 is an enlarged detail section of a valve included in the construction and Fig. 4 is a diagrammatic view showing an installation including an automatic regulating device.

Feed water coming from a feed water heater of any well known character located exteriorly of the boiler enters through the pipe 1 into a trunk or chamber 2 extending along the side wall of the boiler, the upper end of said trunk and the lower end of said pipe being preferably below the water level indicated by the dotted line A—A in Fig. 2. The lower end of the chamber or trunk 2 communicates with a sludge collecting pocket 3 located within a casing 4 secured at the lower portion of the boiler. This pocket surrounds a filter indicated at 5 and set within a suitable holder 5' which may consist of perforated sheet metal while the filtering material may be a loose filling of coke, volcanic pebbles or the like. The holder 5' communicates with the boiler at the lower portion thereof so that the feed water passing from the pocket 3 through the filter will reach the boiler at the lowermost and therefore coolest portion thereof. The pocket 3 is provided at its bottom with a suitable outlet normally closed by a valve 6 of any suitable construction. In Fig. 3 a preferred construction of the valve 6 is shown as consisting of a pair of similarly shaped members 6ª, 6ᵇ, secured to an actuating shaft 6ᶜ, the outer free ends of said members closing the aligned ends of the conduit 6ᵈ and being held in contacting engagement with the ends of said conduit by the spring 6ᵉ; said spring being located within the opened cup-shaped pockets 6ᶠ formed in said members. Upon opening said valve the sludge which has accumulated in the pocket 5 and in the filtering material will be discharged through a suitable outlet device 7, it being noted that this sludge will be discharged together with water taken from the lowermost portion of the boiler, which water therefore is relatively cool. In order to prevent the discharge of any hot water I have shown a shield 8 located adjacent to the upper portion of the filter so that only water from the lower portion of the boiler will be discharged. The device 7 is of such character as to cause the sludge and water to be discharged without pressure and in a practically noiseless manner.

If the feed water, owing to lack of preheating or to insufficient preheating, is of a moderate temperature only, it is introduced into the boiler, not through the pipe 1, but through a separate inlet pipe 9, which discharges into a pan 10 located in the steam space of the boiler. This pan overflows at its central portion into another pan 11 likewise located in said steam space and this second pan 11 overflows at its outer portion into a third pan 12 located chiefly in the steam space of the boiler and having a central outlet discharging the purified water into the main body of water contained in the boiler. The three pans 10, 11 and 12 are superposed so as to pass the water successively from one to the other. As this water flowing in through pipe 9 receives a high degree of heat from contact with the steam, the mineral and other impurities contained in the water are converted into boiler scale and similar stone-like bodies which remain within the pans 10, 11 and 12, while the purified water is discharged into the main body of boiler water. Of course the pans 10, 11 and 12, are to be cleaned from time to time and, as illustrated by the drawings, they may be supported in unison by a removable cover 13.

When the feed water is heated externally of the boiler, for instance, by means of the furnace gases as, for example, by a feed water heater 15 as shown in Fig. 4, or by exhaust steam or gases, I find it desirable to heat such water to a temperature of from about 100° to 130° centigrade, and to subject this feed water to no temperature higher than about 140° until the scum or sludge has been separated from it in the pocket 3. By keeping the temperature of the feed water below 140° until the sludge or the like has been separated from it, I prevent the transformation of such matter into boiler scale. It will be readily understood that by removing the scale-forming substances from the feed water before such feed water is admitted to the main body of water in the boiler, I secure important advantages particularly in that the heating surfaces of the boiler will become more efficient in transferring heat and will require cleaning and repairs much less frequently. My desire to avoid the heating of the feed water above 140° centigrade is the reason that I do not bring it into direct contact with the steam when I admit such feed water through the pipe 1. In its passage from the pipe 1 to the pocket 3 the feed water preheated externally of the boiler will give off any air or gases that it may have absorbed, such absorbed air or gases rising in the trunk 2 and mixing with the steam in the steam space of the boiler. If, however, provision has been made exteriorly of the boiler to remove air and gases from the feed water (as by a suitable apparatus through which the feed water flows on its way from the feed water heater to the boiler) the pipe admitting the preheated feed water would be connected directly with the pocket 3 and the trunk 2 would be omitted in this case. Even when the feed water is preheated within the steam space of the boiler as when such feed water is admitted through the pipe 9, I secure the same advantages resulting from the elimination of scale-forming impurities, without materially reducing the efficiency of the boiler, if this preheating of the feed water within the boiler takes place during the intervals when the boiler is not furnishing steam for the engine. Such intervals occur in the operation of engines, particularly of locomotive engines, and the drawing illustrates the application of this invention to a locomotive engine. The supply of feed water to the sludge collector 3 or to the steam space of the boiler could be made to depend automatically on the steam pressure prevailing in the slide-valve chest of the engine, in such a manner that when there is pressure in such chest (that is, when the feed water is being heated by the exhaust or by combustion gases) the feed water would be directed to the sludge collector 3, while when there is no pressure in the slide valve-chest (that is to say, when the feed water is not being preheated externally of the boiler) the feed water would be fed directly to the steam space of the boiler as by the pipe 9. In this way the excess of steam frequently existing at the times that the engine is not receiving steam from the boiler, would not be wasted but would be utilized to heat the cold feed water and thus this otherwise wasted heat would be recovered. By controlling the supply of feed water to one path or the other in accordance with the pressure existing in the slide-valve chest, I am enabled to dispense with the safety devices now commonly used for the purpose of guarding against the supply of cold feed water; moreover the heat employed for preheating of the feed water would be utilized fully; furthermore the regulator could be located adjacent to the boiler scale collector (such as the pans 10, 11 and 12) for instance, in the same steam space and yet the same amount of dry steam would be supplied thereto.

A suitable construction for effecting the automatic feeding of the feed water to either the steam or water space of the boiler is shown in Fig. 4 of the drawing, and may consist, as shown in such figure, of a suitable apparatus or casing 16, having connected therewith a pipe 17 leading to an injector for supplying feed water directly to the boiler from the tender without preheating such feed water. Said casing 16 is also connected by the pipe 19 with the feed water heater 15, which is in turn connected with the tender through the pipe 20, and which may be heated by exhaust steam or furnace gases in the well known manner. The upper part of casing 16 is formed into a steam cylinder 21, in which a piston 22 is slidably mounted. A pipe 23 connects the cylinder 21 with the steam chest 24 for causing the piston 22 to be actuated. The piston 22 has connected thereto, or formed integrally therewith, a valve 25 provided with the ports 26, which, when the piston and valve are in the upper position, allows the feed water which enters the chamber 27 from either the pipe 19 or the pipe 18, as the case may be, to flow to the pipe 9. When steam is being supplied to the engine, the piston 22 will be forced downwardly by the pressure of the steam against the water pressure in the chamber 27 and will allow the feed water from said chamber to pass through the ports 26 into the pipe 1 from which it passes to the sludge separator or filter, as shown in Fig. 2. It will thus be seen that when exhaust steam is available for heating the feed water in the feed water heater 15, there will be pressure in the pipe 23, consequently the feed water will be automatically caused to pass through pipe 1 and into the water space, while when there is no exhaust steam available for heating, there will be no pressure in the pipe 23 and consequently the piston 22 will be forced upwardly by the pressure of the feed water, thus permitting the feed water to flow through the pipe 9 and to the steam space of the boiler. I have shown the supply pipes 17 and 20 as being controlled by manually operable valves to enable an injector to be used whenever it is desired to cut out the feed water heater.

If the feed water were heated only moderately in the steam space of the boiler, that is to say, to a temperature only sufficient for separating the sludge but not sufficient to convert it into boiler scale or the like, there would be the danger of heating the water above or below the temperature required for the formation of the sludge, depending on the amount of water supplied; if heated too low, the feed water would leave the filter insufficiently purified; if the temperature to which the feed water is heated should be too high, the trunk 2, the collector pocket 3 and the filter 5, would become clogged with boiler scale.

Various modifications in the specific form shown and described may be made within the scope of the claims without departing from the spirit of my invention.

I claim:

1. The process of purifying feed water for boilers, which consists in heating a quantity of feed water before its admission to the boiler, at such times as the boiler is delivering steam for consumption, passing such preheated feed water through a sludge separator, and then introducing the water thus freed from sludge, into the main body of water in the boiler, while at such times as the boiler is not delivering steam another quantity of feed water is introduced into the steam space of the boiler at a relatively low temperature as compared with the temperature of the first-named quantity of feed water, such other quantity of the feed water being heated in said steam space to about the temperature of the steam, to cause the impurities to be converted into boiler scale or like hard substances, and retaining such hard substances in the steam space of the boiler, while the purified water from which these substances have been removed, is delivered from said steam space to the main body of water in the boiler.

2. The process of purifying feed water for boilers, which consists in heating a quantity of feed water, at such times as the boiler is delivering steam for consumption, separating impurities from such preheated feed water and admitting the resulting purified water to the boiler, while at such times as the boiler is not delivering steam another quantity of feed water is introduced into the steam space of the boiler at a relatively low temperature as compared with the temperature of the first-named quantity of feed water, such other quantity of the feed water being heated in said steam space to about the temperature of the steam, to cause the impurities to be converted into boiler scale or like hard substances, and retaining such hard substances in the steam space of the boiler, while the purified water from which these substances have been removed, is delivered from said steam space to the main body of water in the boiler.

3. The process of purifying feed water for boilers, which consists in heating a quantity of feed water to a temperature of about from 100° to 130° centigrade, at such times as the boiler is delivering steam for consumption, separating impurities from such preheated feed water and admitting the resulting purified water to the boiler below the water level, while at such times as the boiler is not delivering steam another quantity of feed water is introduced into the steam space of the boiler at substantially atmospheric pressure, such other quantity of the feed water being heated in said steam space to about the temperature of the steam, to cause the impurities to be converted into boiler scale or like hard substances, and retaining such hard substances in the steam space of the boiler, while the purified water from which these substances have been removed is delivered from said steam space to the main body of water in the boiler.

4. The process of purifying feed water for boilers, which consists in heating a quantity of feed water externally of the boiler at such times as the boiler is delivering steam for consumption, separating impurities from such preheated feed water and admitting the resulting purified water to the water space of the boiler, while at such times as the boiler is not delivering steam another quantity of feed water is introduced into the steam space of the boiler at a relatively low temperature as compared with the temperature of the first-named quantity of feed water, such other quantity of the feed water being heated in said steam space to about the temperature of the steam, to cause the impurities to be converted into boiler scale or like hard substances, and retaining such hard substances in the steam space of the boiler, while the purified water from which these substances have been removed, is delivered from said steam space to the main body of water in the boiler.

5. The process of purifying feed water for boilers, which consists in heating a quantity of the feed water externally of the boiler at such times as the boiler is delivering steam for consumption, separating impurities from such preheated feed water and admitting the resulting purified water to the water space of the boiler, while at such times as the boiler is not delivering steam another quantity of feed water is introduced into the steam space of the boiler at a relatively low temperature as compared with the temperature of the first-named quantity of feed water, such other quantity of the feed water being heated in said steam space to about the temperature of the steam, to cause the impurities to be converted into boiler scale or like hard substances in the steam space of the boiler, while the purified water from which these substances have been removed, is delivered from said steam space to the main body of water in the boiler, and directing the feed water either to the water space of the boiler, or to the steam space of the boiler, according as the engine, receiving steam from the boiler, is running, or, not.

6. In combination with a steam boiler and an engine receiving steam from such boiler, a feed water heater operative while such engine is running, a conduit leading feed water to the water space of the boiler through said feed water heater, a separator interposed in said conduit, to retain impurities, another conduit leading feed water to the steam space of the boiler, and a controlling device connected with the main steam line of the engine, constructed and arranged to change its position automatically according to whether the engine is running or not, to direct the feed water through said first-named conduit when the engine is running, and through the second-named conduit when the engine is not running.

In testimony whereof I have hereunto set my hand.

OTTO GÜNTHER.